United States Patent [19]

Hirose

[11] Patent Number: 4,953,418

[45] Date of Patent: Sep. 4, 1990

[54] LINEAR FEED MECHANISM

[75] Inventor: Kazuya Hirose, Tokyo, Japan

[73] Assignee: Hihaisuto Seiko Kabushiki Kaisha, Tokyo, Japan

[21] Appl. No.: 347,901

[22] Filed: May 5, 1989

[30] Foreign Application Priority Data

Feb. 3, 1988 [JP] Japan .................................. 63-23391

[51] Int. Cl.⁵ ..................... F16H 26/22; F16H 25/24; F16C 29/06
[52] U.S. Cl. .............................. 74/424.8 A; 74/89.15; 74/424.8 R; 74/459; 108/143; 248/657; 384/45
[58] Field of Search ........ 74/89.15, 424.8 R, 424.8 A, 74/459; 108/143; 248/657; 384/43, 44, 45

[56] References Cited

U.S. PATENT DOCUMENTS

| 238,712 | 3/1881 | Purinton | 248/657 |
|---|---|---|---|
| 3,730,008 | 5/1973 | Sheesley | 74/424.8 A X |
| 3,889,544 | 6/1975 | Suss | 74/424.8 A X |
| 4,248,150 | 2/1981 | Lala | 74/424.8 A X |
| 4,648,726 | 3/1987 | Katahira | 384/45 |

FOREIGN PATENT DOCUMENTS 61-61362 4/1986 Japan .
62-200016 9/1987 Japan .

Primary Examiner—Allan D. Herrmann
Attorney, Agent, or Firm—Wenderoth, Lind & Ponack

[57] ABSTRACT

A linear feed mechanism includes a track member, a moving member movably supported on the track member through a linear motion bearing mechanism, and the moving member is moved relative to the track member by a threaded ball screw shaft. There is a smooth elongated semicircular groove in one face of the track member, a corresponding spirally threaded semicircular groove in the moving member and these two semicircular grooves jointly define a substantially circular through hole. The threaded ball screw shaft is in the through hole, and ball bearings are in between the threads of the threaded ball screw shaft and the spiral thread of the moving member, between the threads of the threaded ball screw shaft and the smooth surface of the semicircular groove of the track member, and also in a ball bearing circulating passage extending from one part of the spirally threaded surface of the moving member to another part thereof for causing ball bearings to move from one part of the threads to another when the threaded ball screw shaft is rotated for causing the moving member to move linearly relative to the track member. A second ball bearing tube can provide additional enhanced operation, slidable support of the moving member on the track member, and improved sliding and linear motion accuracy of the linear feed mechanism.

10 Claims, 6 Drawing Sheets

LINEAR FEED MECHANISM

BACKGROUND OF THE INVENTION

1. Field of the Invention

The present invention relates to a straight or linear feed mechanism used for straight or linear motion feeding in various machines such as machine tools, general industrial machines, robots, and measuring instruments.

2. Description of the Prior Art

Convention straight or linear feed mechanisms have been suggested as disclosed in Japanese Utility Model Early-Disclosure No. 61-61362 and Japanese Patent Early-Disclosure No. 62-200016. These two devices are described below in reference to FIGS. 5 (a) and (b), respectively.

In the mechanism of Japan No. 61-61362, as shown in FIG. 5(a), a moving member c straddling a track member a is movably supported by straight or linear motion bearing mechanisms b, and a nut portion d of a ball screw is provided beside or atop the moving member c. A threaded shaft e is engaged with the nut portion d, and by turning the threaded shaft e, the nut portion d and the moving member c are moved along the track member a by the straight motion bearing mechanisms b.

In the mechanism of Japan 62-200016, as shown in FIG. 5(b), track members a and a' are provided on both sides of a moving member c along with a nut portion d of a ball screw. Straight or linear motion bearing mechanisms b and b' are provided between the moving member c and track members a and a' on both sides. By rotating the threaded shaft e engaged with nut portion d, the moving member c is moved along the track members a and a' disposed on both sides. Each of these two conventional straight feed mechanisms has problems which are solved by the present invention.

For example, as the conventional track member(s) a, the straight or linear motion bearing mechanisms b, and the threaded shaft e are installed separately at positions spaced apart from each other, such convention linear feed mechanisms have many problems. Such problems include: the number of parts required is large, many hours are required for fabrication, assembly is labor intensive, assembly accuracy such as achieving parallelism is relatively difficult to achieve, and the space occupied by the mechanism is relatively large.

SUMMARY

The object of the present invention is to solve the problems discussed above.

The linear feed mechanism of the present invention solves all the above problems by essentially providing ball bearings between grooves on a rotatable threaded shaft and the grooves of a moving member moved by the threaded shaft through the action of the ball bearings. A ball bearing circulating passage communicates the respective ends of the groove for circulating the ball bearings from one end of the groove defined by the moving member and the threaded shaft to another end thereof when the threaded shaft is rotated.

In a first embodiment of the present invention the linear feed mechanism comprises a track member 1, and a moving member 3 movably supported by a straight or linear motion bearing mechanism 2 and straddling track member 1. Semicircular grooves 5a and 5b define a circular space or through hole extending in the direction of movement. Grooves 5a and 5b are in spaced opposed portions of the track member 1 and the moving member 3, respectively. There is a threaded shaft 6 of a ball screw located in the circular through hole 4. Threaded shaft 6 has a spiral groove 7 which engages a groove face 8 in semi-circular section 5b of moving member 3. The semi-circular groove 5a of track member 1 has a smooth face 9. And, the moving member 3 is provided with a circulating passage 11 receiving balls 10 and communicating both the ends of groove face 8.

In a second embodiment of the present invention the linear feed mechanism comprises the track member 1 and a moving member 3 movably supported by straight or linear motion bearing mechanisms 2 and straddling the track member 1. Semicircular grooves 5a and 5b jointly define a circular through hole 4 extending in the direction of movement. Semicircular grooves 5a and 5b are formed in the respective facing portions of the track member 1 and the moving member 3 and are spaced opposed and close to each other. A threaded shaft 12 is disposed in the circular through hole 4. The semi-circular groove 5b of the moving member 3 has an internal thread portion 14 corresponding to the external thread 13 of threaded shaft 12. External threads 13 directly contact internal threads 14 and move moving member 3 linearly when the threaded shaft 12 is rotated. And, the semi-circular groove 5a of track member 1 has a smooth face 15. A ball bearing circulating path can also be provided for circulating ball bearings 17 in a space defined by grooves 16a and 16b.

Thus, given these two exemplary embodiments and variants thereof within the scope of the present invention, the above discussed problems of conventional linear feed mechanisms are overcome. The present invention uses fewer parts, fewer hours for fabrication, increases accuracy of assembly, enhances the parallelism between the stationary and the moving members of the mechanism, reduces the overall amount of space required and increases the accuracy of operation.

DESCRIPTION OF THE PREFERRED EMBODIMENTS

Figure 1A:
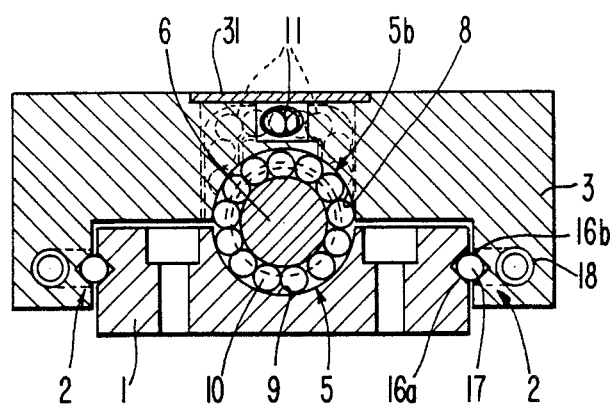
FIG. 1(a) is a cross sectional view of portions of the first embodiment of the linear feed mechanism of the present invention.

The first embodiment of the present invention is as described below. In a first embodiment of the present invention the linear feed mechanism comprises a track member 1, and a moving member 3 movably supported by a straight or linear motion bearing mechanism 2 and straddling track member 1. Semicircular grooves 5a and 5b formed in the top face of the track member and the bottom face of the moving member, respectively, define a circular space or through hole extending in the direction of movement between the track member and the moving member. Grooves 5a and 5b are in spaced opposed portions of the track member 1 and the moving member 3, respectively. There is a threaded shaft 6 of a ball screw located in the circular through hole 4. Threaded shaft 6 has spiral groove 7 which engages a groove face 8 in semi-circular section 5b of moving member 3. The semi-circular groove 5a of track member 1 has a smooth face 9. And, the moving member 3 is provided with a circulating passage 11 receiving balls 10 and communicating both the ends of groove face 8.

Figure 1B:
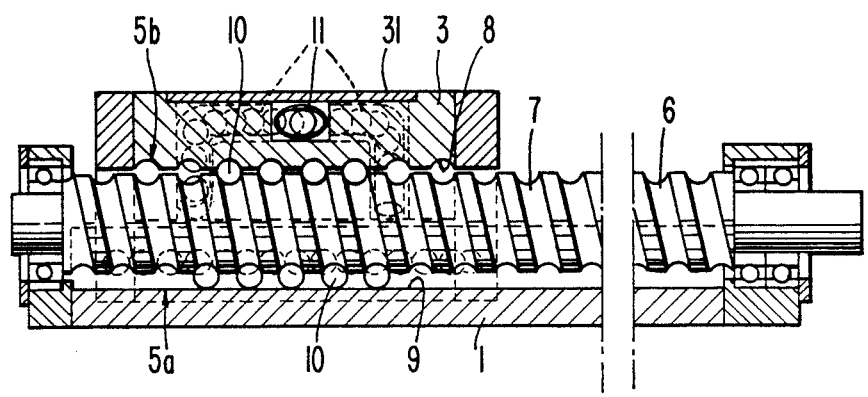
FIG. 1(b) is a vertical sectional view of the first embodiment of FIG. 1(a)
Figure 2A:
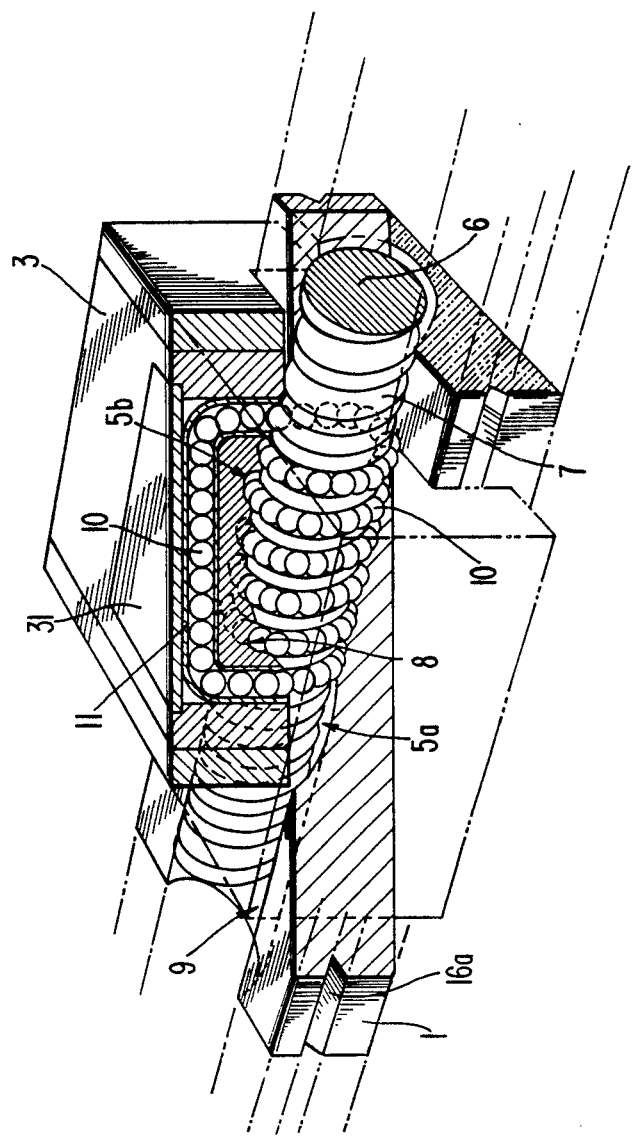
FIG. 2(a) is a partially broken away perspective view of the first embodiment of the invention.
Figure 2B:
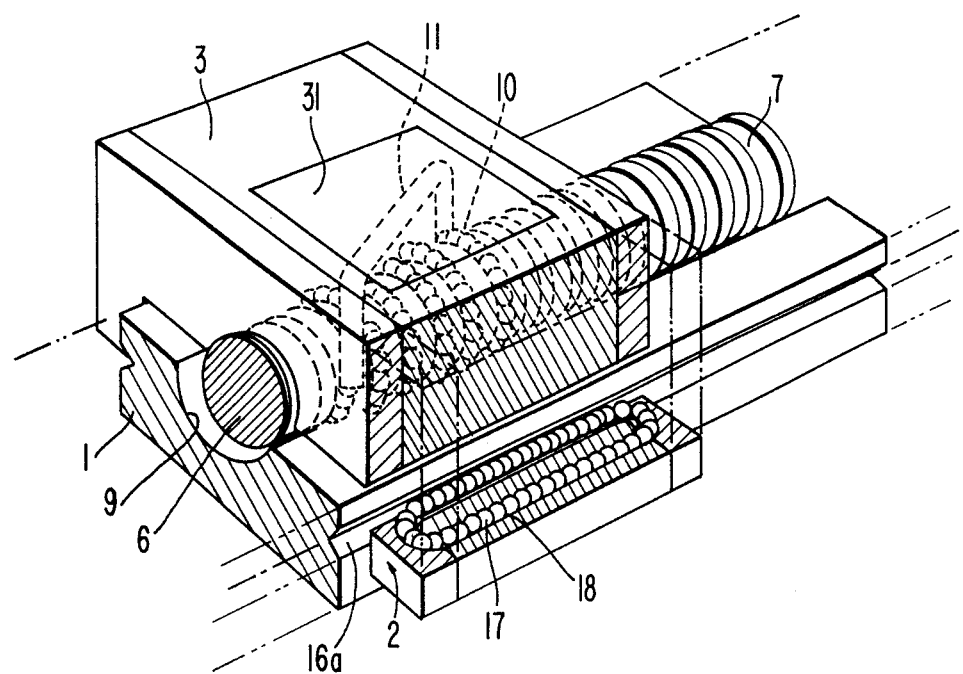
FIG. 2(b) is another partially broken away perspective view of the first embodiment of the invention.

In the first embodiment of the linear feed mechanism of the present invention as shown in FIG. 1, when the threaded shaft 6 is rotated, the moving member 3 is pressed on its groove face 8 through the balls 10 from the spiral groove 7; consequently, moving member 3 is moved, leftward, for instance, as viewed in FIG. 1 (b). The balls 10 are caused to move in the direction opposite to the direction of movement of the moving member 3 along the spiral groove 7, and the balls 10 go into the circulating passage 11 from the inlet at the rear thereof, move forward through circulating passage 11, and are supplied again from the outlet at the front thereof into the space defined between the spiral groove 7 and the groove face 8. The balls 10 then travel along a plurality of turns of the spiral groove 7 before again entering the circulating passage 11. Circulating passage 11 can be a ball guide or ball tunnel as best seen in FIGS. 2(a) and 2(b). In the semi-circular groove 5b, the balls 10 are caused to move and to press against the groove face 8, for driving the moving member 3; and in the semi-circular groove 5a, the balls 10 simply roll on the smooth face 9 and do not act on the track member 1 at all. That is, the desired driving of the moving member 3 by the threaded shaft 6 through the balls 10 is not disturbed by the contact between the balls 10 and smooth face 9 of semi-circular face 5a. In the semi-circular groove 5a, the balls 10 are prevented from leaving by the spiral groove of the threaded shaft 6, and are circulated as mentioned above. If the threaded shaft 6 is rotated in a reverse direction, reverse action occurs, and the moving member 3 moves rightward as seen in FIG. 1(b). Thus, the moving member 3 is driven by the threaded shaft 6 through the balls 10, and moved straight along the track member 1 by the straight motion bearing mechanisms 2, as predetermined.

Figure 2C:
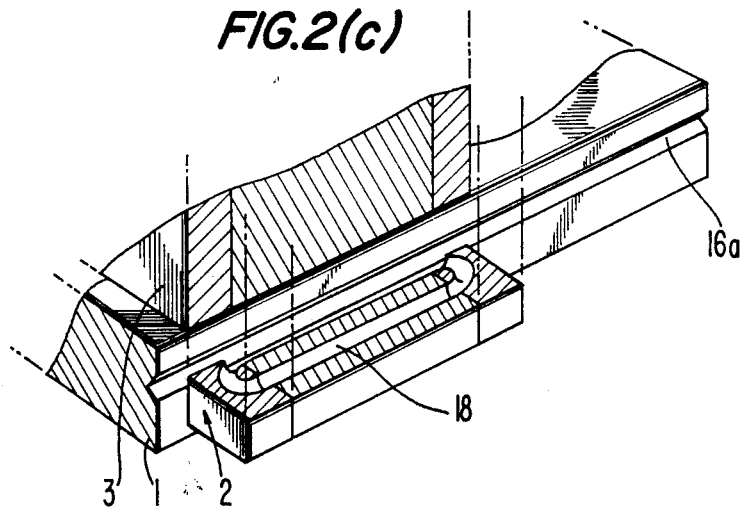
FIG. 2(c) is an enlarged portion of FIG. 2(b) with parts removed for clarity.
Figure 3A:
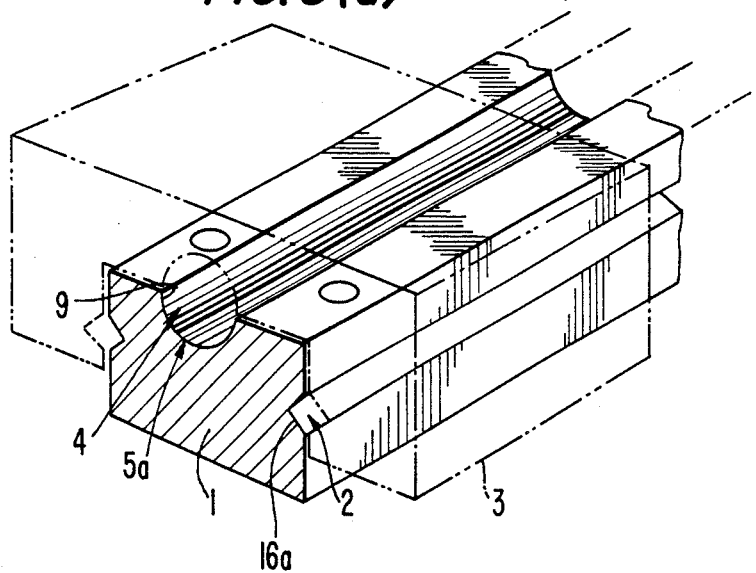
FIG. 3(a) is an illustrative perspective view of a portion of the track member of the present invention.
Figure 3B:
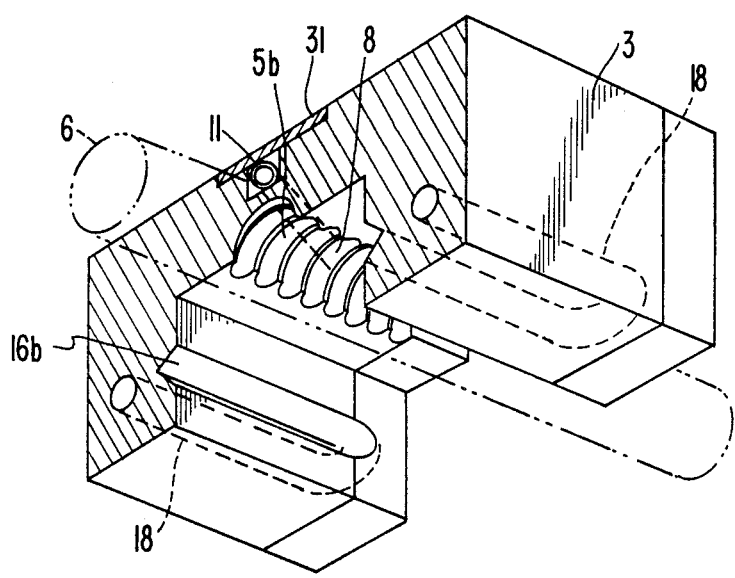
FIG. 3(b) is an illustrative perspective view of the moving member of the present invention.
Figure 4A:
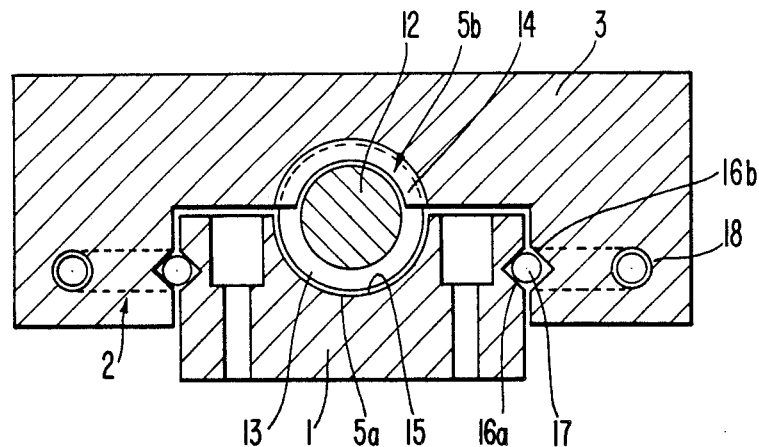
FIG. 4(a) is a cross sectional view of a portion of the second embodiment of the linear feed mechanism of the present invention.
Figure 4B:
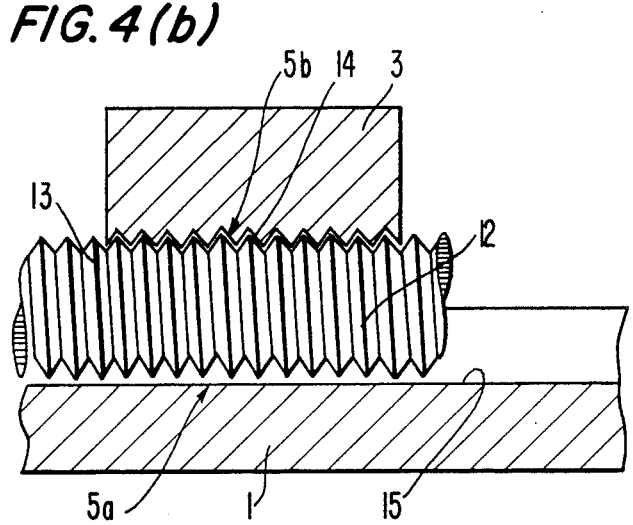
FIG. 4(b) is a vertical section of the cross sectional view of FIG. 4(a) of a portion of the second embodiment of the linear feed mechanism of the present invention.
Figure 5A:
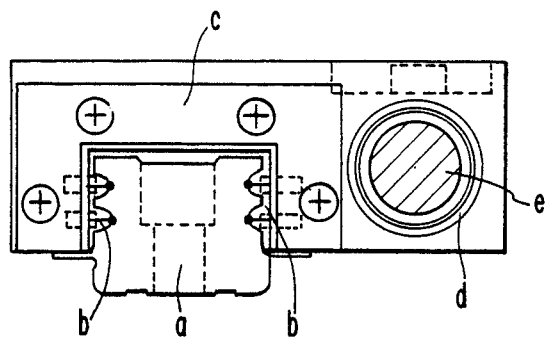
FIG. 5(a) is a front view of a conventional mechanism.
Figure 5B:
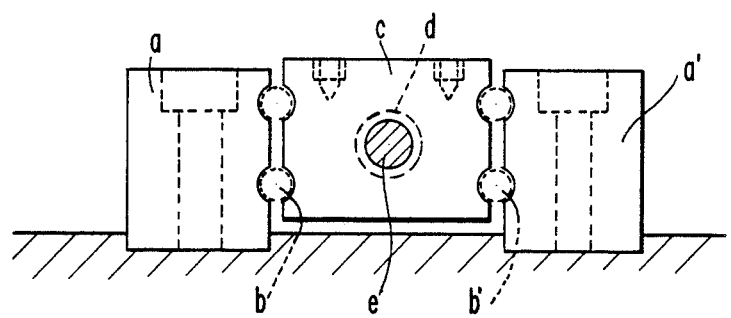
FIG. 5(b) is a front view of another conventional mechanism.

In addition, a cover 31 in moving member 3 over the ball circulating passage 11 can be provided. The cover 31 is best seen in FIGS. 2(a) and 2(b). Also, a second ball circulating passage 18 for circulating balls 17 functions similarly, although not identically, to ball circulating passage 11. Ball circulating passage 18 is in a lower portion of moving member 3 and in an adjacent portion of track member 1, as seen in FIGS. 2(b) and 1(a), for example. FIG. 2(c) shows ball circulating passage 18 with balls 17 removed for clarity. FIG. 2(c) is a partially broken away and somewhat enlarged portion of FIG. 2(b). The function of ball passage 18 can be even better understood in conjunction with the description of a second embodiment of the invention set forth in greater detail below.

In a second embodiment of the present invention the linear feed mechanism comprises the track member 1 and a moving member 3 movably supported by straight or linear motion bearing mechanisms 2 and straddling the track member 1. Semicircular grooves 5a and 5b jointly define a circular through hole 4 extending in the direction of movement. Semicircular grooves 5a and 5b are formed in the respective facing portions of the track member 1 and the moving member 3 and are spaced opposed and close to each other. A threaded shaft 12 is disposed in the circular through hole 4. The semi-circular groove 5b of the moving member 3 has an internal thread portion 14 corresponding to the external thread 13 of threaded shaft 12. External threads 13 directly contact internal threads 14 and move moving member 3 linearly when the threaded shaft 12 is rotated. And, the semi-circular groove 5a of track member 1 has a smooth face 15. A ball bearing circulating path can also be provided for circulating ball bearing 17 in groove 16b.

In the second embodiment of the linear feed mechanism of the present invention, when the threaded shaft 12 is rotated, the external thread 13 of the threaded shaft 12 presses and moves the internal thread portion 14 of the moving member 3, but does not act on the smooth face 15 of the track member 1 at all, whereby the desired linear motion is not disturbed. Therefore, the moving member 3 is driven by the threaded shaft 12 and moved straight along the track member 1 by the straight motion bearing mechanisms, accurately, and as predetermined. A ball bearing circulating passage 18 functions in a similar although different manner as the circulating passage 11 of the first embodiment functions. A circulating passage 18 is provided on each side of the threaded ball screw shaft as described in more detail later.

The illustrated straight motion bearing mechanisms 2 are as described below. In the straight motion bearing mechanisms 2, grooves 16a and 16b are formed longitudinally in the face portions of the track member 1 and the moving member 3. The moving member 3 is movably supported by the track member 1 through the balls 17 inserted in the spaces between the grooves 16a and 16b. The moving member 3 has circulating passages 18 for the balls 17 communicating between both the ends of the respective grooves 16b. The straight motion bearing mechanisms 2 can also be constructed in any other suitable way which falls within the scope of the invention.

In the present invention, as described in the above embodiments, a threaded shaft of an ordinary screw or ball screw is set in a circular space or through hole formed by the semi-circular grooves in the respective facing portions of a track member and a moving member, and the track member for forming the straight motion bearing mechanisms and the threaded shaft used as a drive mechanism are thereby integrated. Therefore, as compared with conventional mechanisms, the linear feed mechanism of the present invention has the advantage that the number of parts used and the fabrication time can be decreased, that the assembling accuracy such as parallelism can be achieved easily, and that the space occupied by the linear feed mechanism can be decreased.

What is claimed is:

1. A linear feed mechanism comprising:
   a track member having a top face with a semi-circular groove formed therein, and said track member semi-circular groove having a substantially smooth surface;
   a moving member movably disposed on said track member and having a bottom face, said moving member having a semi-circular groove formed in said bottom face thereof, said moving member semi-circular groove having a spirally threaded face, and said moving member semi-circular groove and said track member semi-circular groove jointly defining a substantially circular through hole formed between said track member and said moving member;
   a linear motion bearing means disposed between said track member and said moving member for movably supporting said moving member on said track member;
   a threaded ball screw shaft rotatably attached to said track member and disposed in said through hole, said threaded ball screw shaft having a spiral thread on the outer surface thereof corresponding to said spirally threaded face of said moving member semi-circular groove;
   a first ball bearing circulating passage in said moving member, said first ball bearing circulating passage communicating one part of said spirally threaded face of said moving member semi-circular groove with another part of said spirally threaded face of said moving member semi-circular groove for causing ball bearings in said first ball bearing circulating passage to move from said one part of said spirally threaded face of said moving member semi-circular groove to said other part of said spirally threaded face of said moving member semi-circular groove when said threaded ball screw shaft is rotated for linearly moving said moving member relative to said track member; and
   a first plurality of ball bearings disposed in said first ball bearing circulating passage, between said spiral thread on the outer surface of said threaded ball screw shaft and said spirally threaded face of said moving member semi-circular groove, and between said spiral thread on the outer surface of said threaded ball screw shaft and said substantially smooth surface of said semi-circular groove of said track member.

2. A linear feed mechanism as in claim 1, wherein said linear motion bearing means includes a second ball bearing circulating passage, and said second ball bearing circulating passage having a second plurality of ball bearings disposed therein for circulating therethrough when said moving member moves relative to said track member.

3. A linear feed mechanism as in claim 2, wherein said second ball bearing circulating passage includes a ball bearing tunnel in said moving member and a pair of spaced opposed ball bearing receiving grooves in said moving member and in said track member.

4. A linear feed mechanism comprising:
   a track member having a top face with a semi-circular groove formed therein, and said track member semi-circular groove having a substantially smooth surface;
   a moving member movably disposed on said track member and having a bottom face, said moving member having a semi-circular groove formed in said bottom face thereof, said moving member semi-circular groove having a spirally threaded face, and said moving member semi-circular groove and said track member semi-circular groove jointly defining a substantially circular through hole formed between said track member and said moving member;
   a linear motion bearing means disposed between said track member and said moving member for movably supporting said moving member on said track member, said linear motion bearing means including a spaced opposed pair of ball bearing receiving grooves in said track member and said moving member, a plurality of ball bearings received in said spaced opposed pair of ball bearing receiving grooves in said track member and said moving member for movably supporting said track member on said moving member, and a ball bearing circulating passage in said moving member, said ball bearing circulating passage communicating one part of said ball bearing receiving groove with another part of said ball bearing receiving groove for causing said plurality of ball bearings to move from said one part of said ball bearing receiving groove to said other part thereof when said moving member is moved linearly relative to said track member; and
   a threaded ball screw shaft rotatably attached to said track member and disposed in said through hole, said threaded ball screw shaft having a spiral thread on the outer surface thereof corresponding to and mating with said spirally threaded face of said moving member semi-circular groove for moving said moving member linearly relative to said track member when said threaded ball screw shaft is rotated and said spiral thread thereof contacts said spirally threaded face of said moving member.

5. A linear feed mechanism comprising:
   a track member having a semi-circular groove therein, and said track member semi-circular groove having a substantially smooth surface;
   a moving member movably disposed on said track member, said moving member having a semi-circular groove therein, said moving member semi-circular groove having a spirally threaded face, and said moving member semi-circular groove and said track member semi-circular groove jointly defining a substantially circular through hole;
   a linear motion bearing means disposed between said track member and said moving member for movably supporting said moving member on said track member;
   a threaded ball screw shaft rotatably attached to said track member and disposed in said through hole, said threaded ball screw shaft having a spiral thread on the outer surface thereof corresponding to said spirally threaded face of said moving member semi-circular groove;
   a first ball bearing circulating passage in said moving member, said first ball bearing circulating passage communicating one part of said spirally threaded face of said moving member semi-circular groove with another part of said spirally threaded face of said moving member semi-circular groove for causing ball bearings in said first ball bearing circulating passage to move from said one part of said spirally threaded face of said moving member semi-circular groove to said other part of said spirally threaded face of said moving member semi-circular groove when said threaded ball screw shaft is rotated for linearly moving said moving member relative to said track member, said first ball bearing circulating passage spanning a plurality of the threads of said moving member semi-circular groove; and a first plurality of ball bearings disposed in said first ball bearing circulating passage, between said spiral thread on the outer surface of said threaded ball screw shaft and said spirally threaded face of said moving member semi-circular groove, and between said spiral thread on the outer surface of said threaded ball screw shaft and said substantially smooth surface of said semi-circular groove of said track member.

6. A linear feed mechanism as in claim 5, wherein said linear motion bearing means includes a second ball bearing circulating passage, and said second ball bearing circulating passage having a second plurality of ball bearings disposed therein for circulating therethrough when said moving member moves relative to said track member.

7. A linear feed mechanism as in claim 6, wherein said second ball bearing circulating passage includes a ball bearing tunnel in said moving member and a pair of spaced opposed ball bearing receiving grooves in said moving member and in said track member.

8. A linear feed mechanism comprising:

a track member having a semi-circular groove therein, and said track member semi-circular groove having a substantially smooth surface;

a moving member movably disposed on said track member, said moving member having a semi-circular groove therein, said moving member semi-circular groove having a spirally threaded face, and said moving member semi-circular groove and said track member semi-circular groove jointly defining a substantially circular through hole;

a linear motion bearing means disposed between said track member and said moving member for movably supporting said moving member on said track member;

a threaded ball screw shaft rotatably attached to said track member and disposed in said through hole, said threaded ball screw shaft having means, comprising spiral threads on the outer surface thereof corresponding to said spirally threaded face of said moving member semi-circular groove, for allowing a first plurality of ball bearings, disposed in a spiral groove formed between said spiral threads on the outer surface of said threaded ball screw shaft and said spirally threaded face of said moving member semi-circular groove and between said spiral threads on the outer surface of said threaded ball screw shaft and said substantially smooth surface of said track member, to travel about the ball screw shaft when the ball screw shaft is rotated; and means, comprising a first ball bearing circulating passage in said moving member, for causing the ball bearings to move from one part of said spiral groove to another part of said spiral groove after the ball bearings have travelled about said ball screw shaft through at least one turn of said spiral groove when said threaded ball screw shaft is rotated for linearly moving said moving member relative to said track member.

9. A linear feed mechanism as in claim 8, wherein said linear motion bearing means includes a second ball bearing circulating passage, and said second ball bearing circulating passage having a second plurality of ball bearings disposed therein for circulating therethrough when said moving member moves relative to said track member.

10. A linear feed mechanism as in claim 9, wherein said second ball bearing circulating passage includes a ball bearing tunnel in said moving member and a pair of spaced opposed ball bearing receiving grooves in said moving member and in said track member.

* * * * *